(12) United States Patent
Takata et al.

(10) Patent No.: US 7,379,172 B2
(45) Date of Patent: May 27, 2008

(54) METHOD AND APPARATUS FOR INSPECTION OF OPTICAL COMPONENT

(75) Inventors: Kazumasa Takata, Ibaraki (JP); Hidetoshi Utsuro, Kadoma (JP); Tomotaka Furuta, Osaka (JP); Takashi Urashima, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 363 days.

(21) Appl. No.: 11/319,172

(22) Filed: Dec. 28, 2005

(65) Prior Publication Data

US 2006/0192977 A1 Aug. 31, 2006

(30) Foreign Application Priority Data

Jan. 6, 2005 (JP) ............................. 2005-001196

(51) Int. Cl.
*G01N 21/00* (2006.01)

(52) U.S. Cl. .................................. 356/237.2; 356/237.1
(58) Field of Classification Search ... 356/237.1–237.6
See application file for complete search history.

(56) References Cited

U.S. PATENT DOCUMENTS 4,732,473 A * 3/1988 Bille et al. ............... 356/237.5
5,155,606 A * 10/1992 Landesman ................... 359/29
5,801,390 A * 9/1998 Shiraishi ................... 250/559.3

* cited by examiner

*Primary Examiner*—L. G. Lauchman
*Assistant Examiner*—Jarreas C Underwood
(74) *Attorney, Agent, or Firm*—Wenderoth, Lind & Ponack, L.L.P.

(57) ABSTRACT

An inspection method for evaluating the performance of an optical component at high precision is provided. According to the inspection method, a first light beam 24 and a second light beam 26 both having different phases are generated from light which has passed through an optical component 18, and are interfered with each other to form an interference region 30. A linear line 66, a linear line 70 and linear lines 72 are set within the interference region 30 so as to determine a distribution of light intensities on each of the linear lines 72. Then, a frequency corresponding to the maximal light intensity is determined. Further, an approximated liner line or an approximated curved line is determined from a plurality of frequencies determined for each of the linear line 72. Then, the aberration of the optical component is evaluated based on the coefficient of the approximated linear or curved line.

15 Claims, 14 Drawing Sheets

LINEAR FUNCTION FITTING

QUADRATIC FUNCTION FITTING

METHOD AND APPARATUS FOR INSPECTION OF OPTICAL COMPONENT

TECHNICAL FIELD

The present invention relates to a method and an apparatus for inspection of an optical component. In particular, the present invention relates to a method and an apparatus suitable for inspection of the optical characteristics of an optical component in an optical system which records data on a date-recording medium (e.g., an optical disc) or reads the recorded data from the data-recording medium, or performs both of such recording and such reading.

BACKGROUND OF THE INVENTION

To evaluate the optical characteristics of an optical component such as a lens or a prism, the aberration of the optical component is inspected by the use of an interference of light beams. FIG. 23 shows a Mach-Zehnder radial shearing interferometer 1000 which is one of the known techniques for inspecting the characteristics of optical components by the use of the interference of light beams. Referring to the drawing, light 1002 emitted from a light source (not shown) passes through a lens 1004 to be inspected, and a lens 1006, and then is divided by a half mirror 1008, into two light beams 1010 and 1012. The light beam 1010 having passed through the half mirror 1008 reflects on a mirror 1014 and a half mirror 1016 and enters a lens 1018. On the other hand, the light beam 1012 having reflected on the half mirror 1008 further reflects on a half mirror 1020, passes through a converging lens 1022, a pin hole 1024, a lens 1026 and the half mirror 1016, and enters the lens 1018. The two light beams 1010 and 1012 are superposed on the lens 1018 to form an interference figure. The interference figure is projected to an image pickup device 1028. Information contained in the interference figure is transmitted from the image pickup device 1028 to an analyzer in the form of electronic signal where it is analyzed to evaluate the wave front aberration, namely, the optical characteristics of the optical component or the lens 1004.

The mirror 1014 of the interferometer 1000 is connected to a drive mechanism 1034 for moving the mirror 1014 in the direction indicated by arrow 1032. Typically, the drive mechanism 1034 intermittently moves the mirror 1014 at small intervals of one several tenth of the wavelength of light. A brightness variation of the interference figure received by the image pickup device 1028 is schematically illustrated in FIGS. 24A-24D, obtained by moving the mirror 1014 using the drive mechanism 1034, in the optical axis direction, i.e., light traveling direction at intervals of one forth of the light wavelength $\lambda/4$ ($\lambda$: light wavelength). As can be seen from the drawings, the brightest interference figure is obtained when the difference in optical path length between the two light beams is $n\lambda$ [n: an integer] (see FIG. 24D). The darkest interference figure is obtained when the difference in optical path length between the two light beams is $(1/2+n)\lambda$ (see FIG. 24B). Medium bright interference figures are obtained when the difference in optical path length between the two light beams is $(1/4+n)\lambda$ or $(3/4+n)\lambda$ (see FIGS. 24A and 24C). The relationship between the difference of the optical path length and the brightness of the interference figure is shown in the following Table 1.

TABLE 1

Relationship between Difference in Optical Path Length and Brightness of Interference Figure

| Difference in optical path length | $(1/4 + n) \lambda$ | $(1/2 + n) \lambda$ | $(3/4 + n) \lambda$ | $(n) \lambda$ |
|---|---|---|---|---|
| Brightness of interference figure | Medium | Dark | Medium | Bright |
| Corresponding Figure | FIG. 24A | FIG. 24B | FIG. 24C | FIG. 24D | n: an integer
$\lambda$: the wavelength of light

Using the characteristics, the analyzer 1030 obtains necessary information from the interference figures each formed by two light beams having a predetermined phase difference therebetween, and substitutes the obtained information into Zernike Polynomial to thereby evaluate the aberration from the coefficients of the Polynomial.

Another light interference evaluation technique, a phase shift method, is disclosed in Documents 1 and 2. Referring to FIGS. 25, 26A, 26B, 27A, 27B and 28, according to the phase shift method, one wave front (1100) out of two wave fronts to be interfered with each other is moved relative to the other wave front (1102), which causes the interfering conditions to change with the advance of the wave front 1100 and thereby to vary the brightness of the interference figure and the intensity of light change sinusoidally. If the optical system has no aberration, the light intensities at two spaced points X and Y in the interference figure change sinusoidally, respectively, in which no phase difference exists between the changes of both light intensities. If on the other hand the optical system has a certain aberration, a phase difference $\Delta$ exists between the two sinusoidal changes in light intensity.

Non-patent Document 1:

OYOUKOUGAKU HIKARI KEISOKU NYUMON by Toyohiko Tanitakai, Maruzen, 1988, p 131

Non-patent Document 2:

Principles of Optical components by M. Born and E. Wolf, Tokaidaigaku Shuppan, 1995, p 69

Typically, the light intensity of an interference figure or interference fringes may change due to not only an interference but also another factor such as variation in the sensitivity of a camera or distribution of light intensities of an original wave front. The change of light intensity due to another factor are evaluated by the phase shift method, so that only the change of light intensity due to an interference can be expressed in the form of a phase change or phase pattern. Specifically, the phase pattern is determined by receiving the interference figure obtained when the difference in wave fronts of two beams equals to one wavelength, by the use of Discrete Fourier Transform. A phase pattern may be obtained without using the Fourier transform, by appropriately using the phase advancement between two wave fronts and the number of figures picked up.

The interferometer using the phase shift method has two problems. One is the need of precisely moving an optical component such as a mirror with a slow motion mechanism using, for example, a piezoelectric element. The other is the need of causing a larger difference in optical path length between two wave fronts to be interfered with each other.

A Patent Document 1 discloses an interference fringe-analyzing technique which solves the former problem. According to this technique, parallel light is transmitted into a half mirror which is obliquely disposed to the traveling direction of the parallel light, where it is divided into a first light beam which passes through the half mirror and a second light beam which reflects on the half mirror. The first light beam is reflected on a member to be evaluated and again transmitted into the half mirror where it is reflected and then is received by an image pickup device. The second light beam having reflected on the half mirror is further reflected on a reference surface and transmitted through the half mirror and is finally received by the image pickup device. The image pickup device picks up an interference figure formed by the first and second light beams. Information of the interference figure picked up are transmitted in the form of electronic signal to an image input board where the interference figure is analyzed by the use of Fourier Transform to evaluate the aberration of the subject member.

Patent Document 1: JP 2001-227907 A

Patent Document 2 discloses the shearing interference optical system which solves the latter problem. According to the shearing interference optical system, light having passed through a lens to be evaluated enters a diffraction grating. The diffraction grating emits diffracted beams so an interference figure of the diffracted beams of different orders such as 0th-order and +1st-order diffracted beams or 0th order and −1st-order diffracted beams is projected onto the image pickup device. During the image pickup operation, the diffraction grating is moved in a direction orthogonal to the grooves of the grating. As a result, the light intensity of the interference figure changes due to the change of the distance between the wave fronts of the two diffracted rays interfered with each other. Then, the change of light intensity is evaluated by the phase shift method so as to evaluate the aberration of the lens.

Patent Document 2: JP 2000-329648 A

Each of the Mach-Zehnder radial shearing interferometer and the interferometer using the interference fringe-analyzing method, however, requires a sufficiently large light path difference between two light beams and thereby can suffer from an adverse affect derived from an unevenness of air, i.e., variation of refractive index of air interposed between the beams. This in turn requires that the lens is inspected only within a chamber closely temperature controlled room. The interferometer using the shearing interference optical system requires that the optical component is moved so slowly to obtain interference figures. This means that a possible external vibration, for example, may move the optical component such as mirror to prevent the precise interference image from being obtained, deteriorating the reliability of the evaluation results. To this end, the interferometer should be placed on a vibration-free table, for example, in order not to receive the possible external vibrations.

DISCLOSURE OF THE INVENTION

An object of the present invention is therefore to provide a method for inspection of an optical component and an apparatus therefor, which make it possible to inspect and evaluate the optical characteristics of the optical component, without any affect such as unevenness of an air or possible external vibrations.

To solve the above problems, a method for inspection of an optical component, according to the present invention, comprises the steps of generating a first light beam and a second light beam both having difference phases, from original light which has passed through the optical component;

interfering the first light beam with the second light beam to form an interference region;

setting a first linear line which connects the first center of the first light beam to the second center of the second light beam, and a second linear line which passes through the mid point between the first center and the second center, and intersects vertically to the first linear line;

setting a plurality of third points on the second linear line within the interference region;

setting a plurality of third linear lines which pass through the plurality of the third points and extend in parallel to the first linear line, respectively;

setting a plurality of evaluation points on each of the plurality of the third linear lines;

determining a distribution of light intensities at the plurality of the evaluation points for each of the plurality of the third linear lines;

determining a distribution of light intensities at the plurality of the evaluation points for each of the plurality of the third linear lines;

determining a frequency versus light intensity relationship from the distribution of the light intensities which is determined for each of the plurality of the third linear lines;

determining a frequency versus light intensity relationship from the distribution of the light intensities which is determined for each of the plurality of the third linear lines;

approximating a function to the plurality of the frequencies determined for each of the plurality of the third linear lines, and evaluating the aberration of the optical component based on the coefficient of the approximated function.

In this inspection method, a linear function is provided for the above function, and the coma-aberration of the optical component in the direction of the first linear line is evaluated based on the linear coefficient of this linear function. Further, a quadratic function is provided for the above function, and the spherical aberration of the optical component is evaluated based on the quadratic coefficient of this quadratic function.

Another method for inspection of an optical component, according to the present invention, comprises the steps of generating a first light beam and a second light beam both having difference phases, from original light which has passed through the optical component;

interfering the first light beam with the second light beams to form an interference region;

setting a first linear line which connects the first center of the first light beam to the second center of the second light beam, and a second linear line which passes through the mid point between the first center and the second center, and intersects vertically to the first linear line;

setting a plurality of third points on the second linear line within the interference region;

setting a plurality of third linear lines which pass through the plurality of the third points and extend in parallel to the first linear line, respectively;

setting a plurality of evaluation points on each of the plurality of the third linear lines;

determining a distribution of light intensities at the plurality of the evaluation points for each of the plurality of the third linear lines;

determining a frequency versus light intensity relationship and a frequency versus phase relationship from the distribution of the light intensities which is determined for each of the plurality of the third linear lines;

determining a frequency corresponding to a maximal light intensity for each of the plurality of the third linear lines, from the frequency versus light intensity relationship;

determining a phase corresponding to the maximal light intensity for each of the plurality of the third linear lines, from the frequency versus phase relationship;

approximating a function to the plurality of the phases determined on each of the plurality of the third linear lines; and evaluating an aberration of the optical component based on a coefficient of the approximated function.

In this inspection method, a quadratic function is provided for the above function, and the coma-aberration of the optical component in the direction of the second linear line is evaluated based on the quadratic coefficient of this quadratic function. Further, a linear function is provided for the above function, and the astigmatism of the optical component is evaluated based on the linear coefficient of this linear function.

An apparatus for inspection of an optical component, according to the present invention, comprises a first means which generates a first light beam and a second light beam both having difference phases, from an original light which has passed through an optical component;

a second means which interferes the first light beam with the second light beam to form an interference figure;

a third means which receives the interference figure; and a fourth means which evaluates the optical characteristics of the optical component from the interference figure received by the third means;

wherein the fourth means includes a means for setting a first linear line which connects the first center of the first light beam to the second center of the second light beam, and a second linear line which passes through the mid point between the first center and the second center, and intersects vertically to the first linear line, setting a plurality of third points on the second linear line within the interference region, setting a plurality of third linear lines which pass through the plurality of the third points and extend in parallel to the first linear line, respectively, and then setting a plurality of evaluation points on each of a plurality of third linear lines;

a means for determining a distribution of light intensities of the plurality of the evaluation points for each of the plurality of the third linear lines;

a means for determining a frequency versus light intensity relationship from the distribution of the light intensities determined for each of the plurality of the third linear lines;

a means for determining a frequency corresponding to the maximal light intensity, from the frequency versus light intensity relationship determined for each of the plurality of the third linear lines;

a means for approximating a function to the plurality of frequencies for each of the plurality of the third linear lines; and a means for evaluating the aberration of the optical component based on the coefficient of the approximated function.

In this inspection apparatus, the above means for evaluating the aberration of the optical component sets a linear function for the above function, and evaluates the coma-aberration of the above optical component in the direction of the first linear line, based on the linear coefficient of the above linear function.

In this inspection apparatus, the above means for evaluating the aberration of the optical component sets a quadratic function for the above function, and evaluates the spherical aberration of the above optical component based on the linear coefficient of the above quadratic function.

Another apparatus for inspection of an optical component, according to the present invention, comprises a first means which generates a first light beam and a second light beam both having difference phases, from an original light which has passed through an optical component;

a second means which interferes the first light beam with the second light beam to form an interference figure;

a third means which receives the interference figure, and a fourth means which evaluates the optical characteristics of the optical component from the interference figure received by the third means;

wherein the fourth means includes a means for setting a first linear line which connects the first center of the first light beam to the second center of the second light beam, and a second linear line which passes through the mid point between the first center and the second center, and intersects vertically to the first linear line, setting a plurality of third points on the second linear line within the interference region, setting a plurality of third linear lines which pass through the plurality of the third points and extend in parallel to the first linear line, respectively, and then setting a plurality of evaluation points on each of a plurality of third linear lines;

a means for determining a distribution of light intensities of the plurality of the evaluation points for each of the plurality of the third linear lines;

a means for determining a frequency versus light intensity relationship and a frequency versus phase relationship from the distribution of the light intensities which is determined for each of the plurality of the third linear lines;

a means for determining a frequency corresponding to a maximal light intensity for each of the plurality of the third linear lines, from the frequency versus light intensity relationship;

a means for determining a phase corresponding to the maximal light intensity for each of the plurality of the third linear lines, from the frequency versus phase relationship;

a means for approximating a function to the plurality of the phases determined for each of the plurality of the third linear lines; and a means for evaluating the aberration of the optical component based on the coefficient of the approximated function.

In this inspection apparatus, the above means for evaluating the aberration of the optical component sets a quadratic function for the above function, and evaluates the coma-aberration of the above optical component in the direction of the second linear line, based on the quadratic coefficient of the above quadratic function.

In this inspection apparatus, the above means for evaluating the aberration of the optical component sets a linear function for the above function, and evaluates the astigmatism of the above optical component based on the linear coefficient of the above linear function.

In an specific mode of this inspection apparatus, the first means includes a diffraction grating, and the first light beam and the second light beam are diffracted rays obtained by diffracting the above original light with the diffraction grating.

In another specific mode of this inspection apparatus, the first means includes a breaking means which breaks the above original light into two light beams, and a phase-modulating means which modulates the phase of one of the two light beams into which the breaking means breaks the original light.

In other specific mode of this inspection apparatus, the first means includes a first reflecting face which reflects the above original light to lead the first light beam, and a second reflecting face which is disposed at a position different from the first reflecting face and which reflects the above original light to lead the second light beam, so that the first reflecting face and the second reflecting face are so disposed as to lead the first light beam and the second light beam to the above second means.

EFFECT OF THE INVENTION

According to the present invention so arranged, the optical path lengths in the inspection apparatus can be shortened, so that it is not needed to move the optical component. In addition, a lens-inspecting apparatus reduced in size and excellent in vibration resistance can be provided.

DESCRIPTION OF REFERENCE NUMERALS

Figure 1:
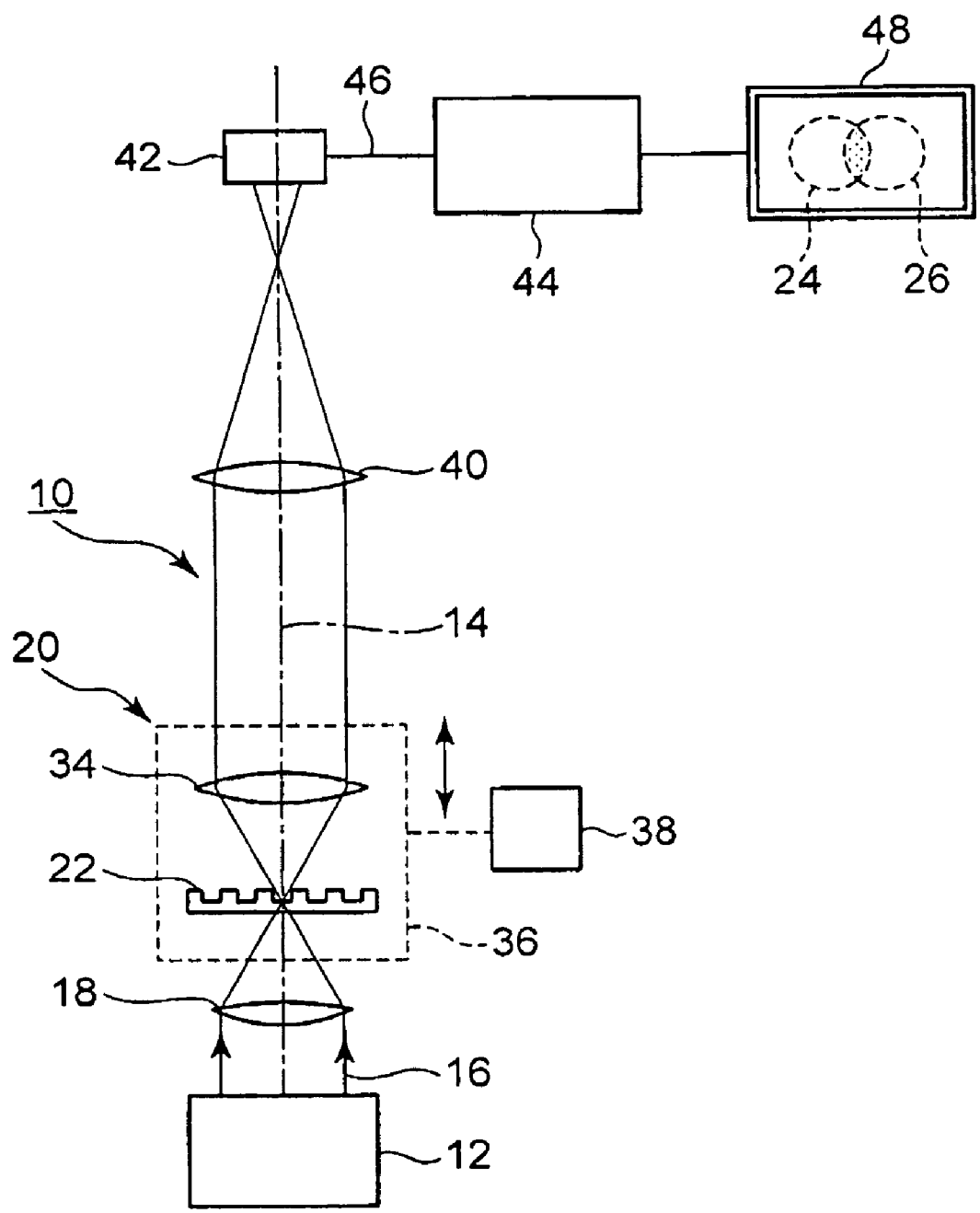
FIG. 1 is a diagram illustrating the arrangement of an inspection apparatus according to the present invention.

10: inspection apparatus, 12: light source, 14: optical axis, 16: original light, 18: lens, 20: interference figure-forming means, 22: diffraction grating, 24: 0th-order diffracted beam, 26: +1st-order f diffracted beam, 28: −1st-order diffracted beam, 30,32: an interference region (an interference figure), 34: lens, 36: holder, 38: drive mechanism, 40: lens, 42: image pickup device, 44: analyzer, 46: cable, 48: display, 50: interference fringes, 52,54,56,58: interference fringe pattern, 60, 62: center, 66: first linear line (X axis), 68: mid point, 70: second linear line (Y axis), 71: third point, 72: a third linear line, 74: a measuring point, 76: distribution of light intensities, 78: relationship between frequency and light intensity, 80: relationship between frequency and phase, 82: frequency characteristics, 84: phase characteristics, and 100,200: inspection apparatus.

PREFERRED EMBODIMENTS OF THE INVENTION

Hereinafter, methods for inspecting optical components, and apparatuses therefor will be described with reference to the accompanying drawings. Throughout the drawings, the like reference numerals denote like components or members.

<1. Arrangement and Operation of Inspection Apparatus>

FIG. 1 schematically shows the general arrangement of an inspection apparatus according to the present invention. As shown in FIG. 1, in the inspection apparatus 10, the light source 12 is provided to emit light (original light) 16 along the optical axis 14 of the inspection apparatus 10. An optical component to be inspected is disposed on the optical axis 14. In this embodiment, the optical component is a convex lens 18 which is disposed with its center axis substantially aligned with the optical axis 14 of the apparatus. The member for inspection is not limited to the convex lens and it may be any lens such as a concave lens, an aspherical lens, and a cylindrical lens. Also, the member for inspection is not limited to such lens and may be other optical components such as an objective lens, a mirror, an aperture plate and a prism.

Figure 2:
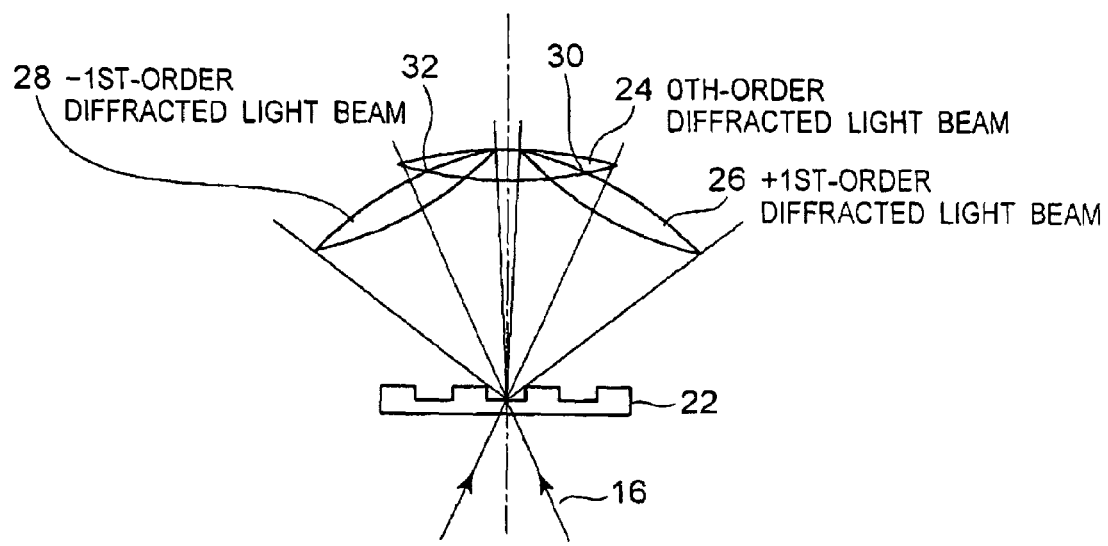
FIG. 2 is a diagram illustrating the conditions of the interference of light beams led from the diffraction grating of the inspection apparatus shown in FIG. 1.

Means 20 for forming interference fringes is disposed on a path along which the light 16 having passed through the lens 18 travels, and a diffraction grating 22 which generates a plurality of light rays or beams having different phases from the original light 16 is disposed at and around the focal point of the lens 18. In this embodiment, the diffraction grating 22 has a plane surface orthogonal to the optical axis 14 and a plurality of parallel grooves orthogonal to the optical axis 14, formed on the plane surface. Accordingly, the diffraction grating 22 generates a plurality of component lights or diffracted rays from the original light 16. For example, FIG. 2 shows three rays including 0th-order diffracted ray 24, +1st-order diffracted ray 26 and −1st-order diffracted ray 28 from the diffraction grating 22. In this embodiment, the 0th-order diffracted ray 24 is interfered with the +1st-order diffracted ray 26 to form an interference FIG. 30, and the 0th-order diffracted ray 24 is interfered with the −1st-order diffracted ray 28 to form another interference FIG. 32.

Referring again to FIG. 1, the interference fringe-forming means 20 includes a lens 34 to which at least one interference figure formed by the diffraction grating 22 enters. In this embodiment, the lens 34 is so disposed as to allow two interference regions (interference figures) 30 and 32 to enter thereto so that the light 16, for converting the incident light 16 into parallel or substantially parallel light beam.

The diffraction grating 22 and the lens 34 are supported together by a support member or holder 36. The holder 36 is connected to a drive mechanism 38 to move together with the diffraction grating 22 and the lens 34 along the optical axis 14. Preferably, the drive mechanism 38 is a piezoelectric drive element capable of moving the holder very slowly.

The lens 40 is so disposed as to receive the parallel or substantially parallel beam from the lens 34 and to converge the light beam from the lens 34.

The image pickup device 42 is so disposed as to receive the light beams from the lens 40, together with the interference regions 30 and 32. Preferably, the image pickup device 42 is made of a charge coupled device (CCD).

The analyzer 44 is connected to the image pickup device 42 via the communication line or the cable 46, so that the information included in the figure picked up by the image pickup device 42 is transmitted through the cable 46 to the analyzer 44. Preferably, the analyzer 44 is provided with a display 48 to thereby display the figure picked up by the image pickup device 42 and the result analyzed by the analyzer 44 as will be described later.

Figure 3:
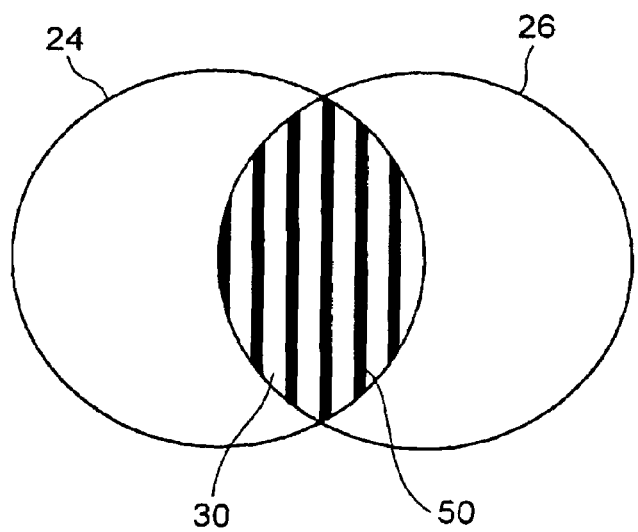
FIG. 3 is a diagram illustrating an interference figure and interference fringes formed in the inspection apparatus shown in FIG. 1.

In the inspection apparatus 10 so constructed, the light 16 emitted from the light source 12 enters the lens 18 to be inspected and then is converged into the diffraction grating 22. The diffraction grating 22 diffracts the received light 16 to generate the diffracted rays including 0th-order diffracted ray 24, +1st-order diffracted ray 26 and −1st-order diffracted ray 28. As shown in FIG. 2, the 0th-order diffracted ray 24 is interfered with the +1st-order diffracted ray 26 to form an interference region 30, and the 0th-order diffracted ray 24 is interfered with the −1st-order diffracted ray 28 to form an interference region 32. Each of the interference regions 30 and 32 contains interference fringes 50 (see FIG. 3). Then the light entered the lens 34 is converted into to parallel light beams and then converged by the lens 40 onto the image pickup device 42. The image pickup device 42 transmits information including in the received figure with the interference regions 30 and 32 to the analyzer 44 through the cable 46. The analyzer 44 processes the figure according to an analyzing method described later, and evaluates the aberration or the optical characteristics of the lens 34.

<2. Analyzer and Analyzing Method>

Figure 4:
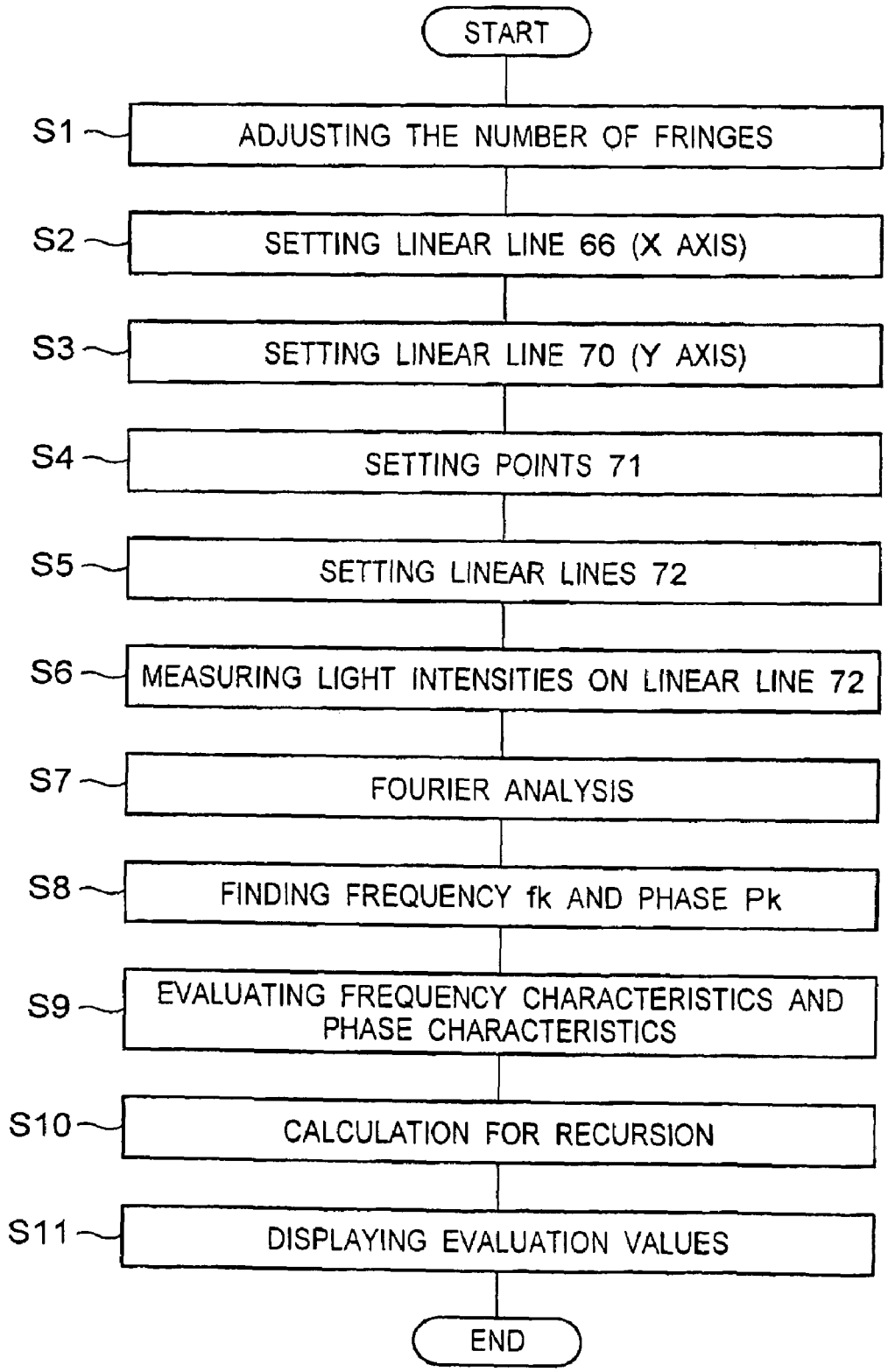
FIG. 4 is a flowchart illustrating the processing by the analyzer shown in FIG. 1.

The analyzer 44 processes the figure according to the flowchart shown in FIG. 4. In this processing, at step 1, the analyzer 44 adjusts the number of the interference fringes 50 which appear in respective interference regions 30 and 32 (see FIG. 3). A density of the interference fringes, i.e., the number of the fringes per unit length varies depending on the degree of the defocus. Therefore, at step S1, the drive mechanism 38 is driven to move the diffraction grating 22 and the lens 34 along the optical axis 14 to thereby adjust the number of the interference fringes. In order to improve the precision of the Fourier analysis described later, it is preferable to increase the number of the interference fringes 50 as much as possible. The number of the interference fringes 50 is counted by the measurement of the distribution of light intensities on a line connecting the centers of two diffracted rays which forms an interference region, or on a line parallel to this line. Alternatively, an operator may visually recognize and count the number of the interference fringes 50 displayed on the display 48.

Figure 5:
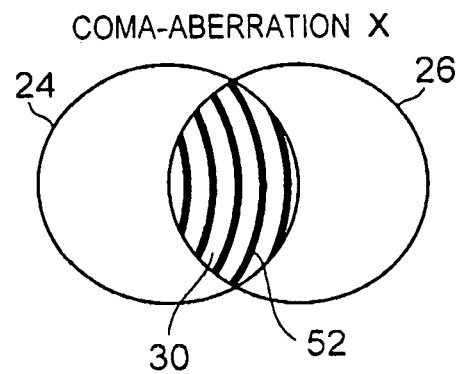
FIG. 5 is a diagram illustrating the interference fringes derived from the comma-aberration (X).
Figure 6:
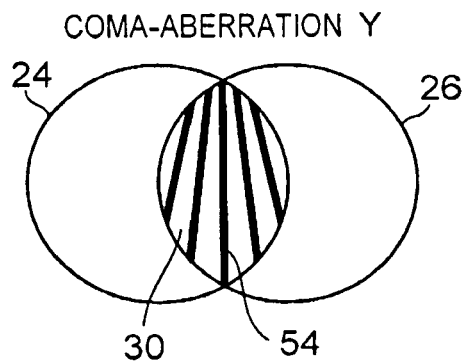
FIG. 6 is a diagram illustrating the interference fringes derived from the comma-aberration (Y).
Figure 7:
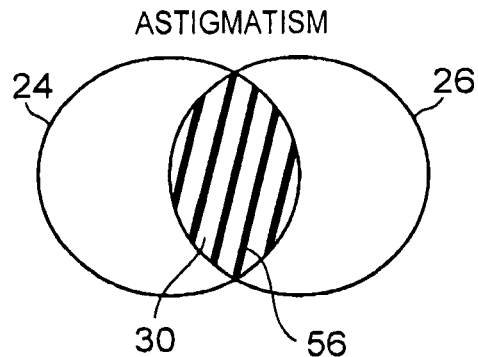
FIG. 7 is a diagram illustrating the interference fringes derived from the astigmatism.
Figure 8:
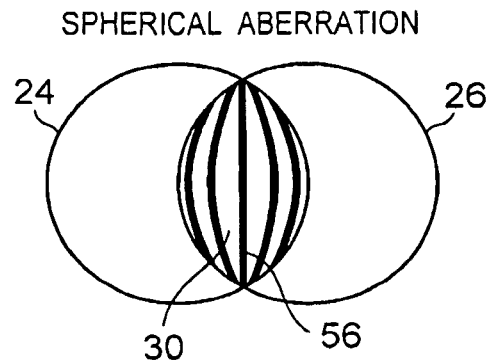
FIG. 8 is a diagram illustrating the interference fringes derived from the spherical aberration.

The pattern of the interference fringes 50 changes depending on the aberration of the lens 18. For example, when the lens 18 contains a coma-aberration (X) in the direction X (orthogonally intersecting the grooves of the diffraction grating) and a coma-aberration (Y) in the direction Y (parallel to the grooves of the diffraction grating), the fringe patterns 52 and 54 shown in FIGS. 5 and 6 appear. When the lens 18 contains an astigmatism and a spherical aberration, the fringe patterns 56 and 58 shown in FIGS. 7 and 8 appear.

Figure 9:
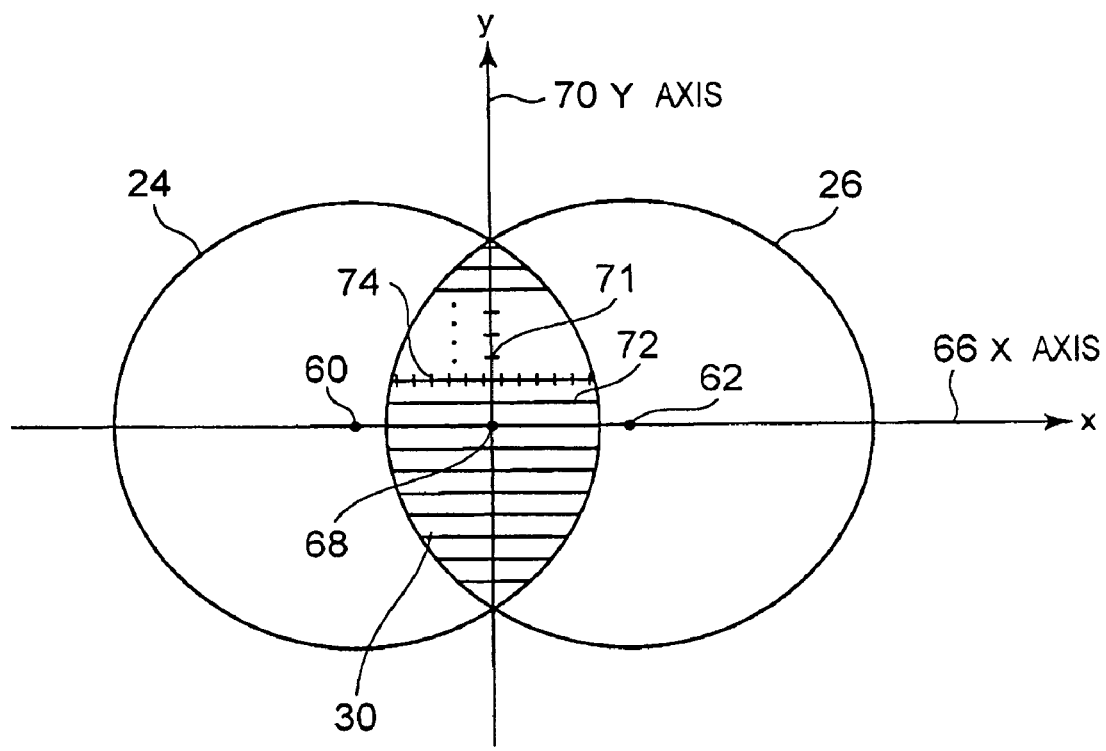
FIG. 9 is a diagram illustrating the processing by the analyzer.

The analyzer 44 analyzes the figure received by the image pickup device 42. Specifically, referring to FIG. 9, at step S2, a first linear line 66 is assumed in the interference region 30 to connect the centers 62 and 64 of the two diffracted rays 24 and 26. The first linear line 66 is aligned with the direction X orthogonally intersecting the grooves of the diffraction grating 22. Hereinafter, the first linear line is referred to as "X axis". Next, at step S3, second linear line 70 is assumed which extends through the mid point 68 between the centers 60 and 62 of the diffracted rays 24 and 26 and orthogonally intersects the X axis 66. The second linear line 70 is aligned with the direction Y parallel to the grooves of the diffraction grating 22. Hereinafter, the second linear line is referred to as "Y axis". Then, at step S4, a plurality of third points 71 are set on the second linear line 70 within the interference region 30. Further, at step S5, a plurality of third linear lines 72 are assumed which pass through the plurality of the third points 71 and extend in parallel to the X axis 66. Preferably, the third points 71 are set at regular intervals on the Y axis 70 so as to facilitate a mathematical analysis as will be made later.

Figure 10:
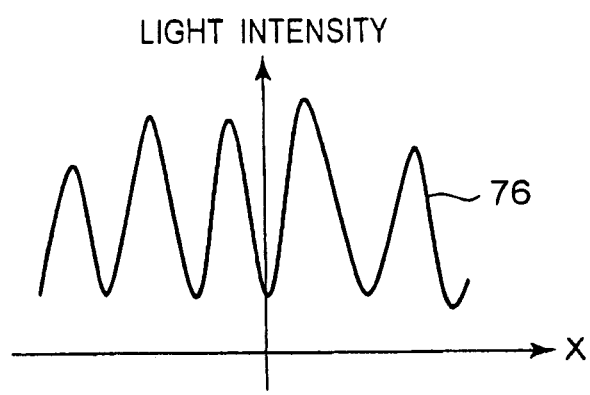
FIG. 10 is a diagram illustrating the distribution of light intensities on a third linear line.

At step S6, the analyzer 44 measures the light intensities at plurality of measuring points 74 on each of the linear lines 72. Preferably, an increased number of measuring points 74 are assigned on each liner line 72 with a reduced regular interval to improve the precision of the Fourier analysis as will be described later. FIG. 10 shows an example of the distribution 76 of the light intensities measured at the measuring points 74 on each of the linear lines 72. As shown in FIG. 10, the light intensity is represents a waveform corresponding to the distribution of the interference fringes 50.

Figure 11:
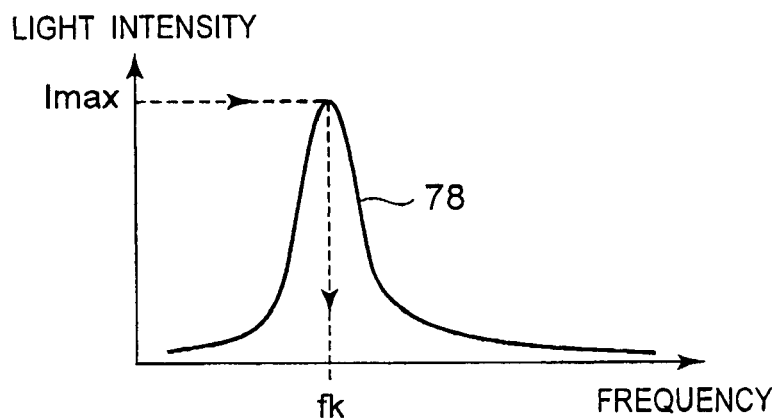
FIG. 11 is a graph illustrating a relationship between the frequency and the light intensity, obtained from the analysis of the distribution of the light intensities shown in FIG. 10, in view of the frequency.
Figure 12:
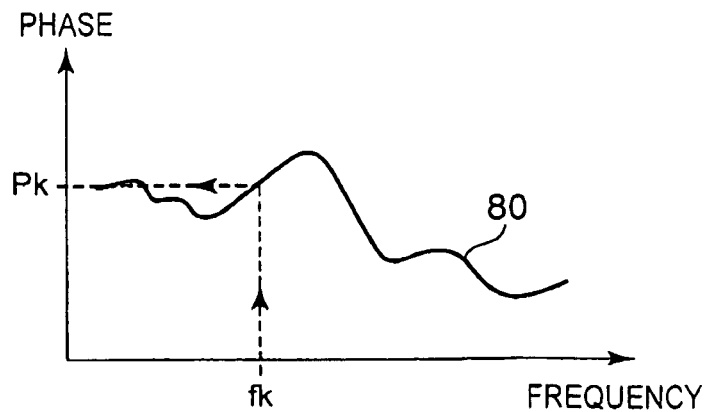
FIG. 12 is a graph illustrating a relationship between the frequency and the phase, obtained from the analysis of the distribution of the light intensities shown in FIG. 10, in view of the phase.
Figure 13:
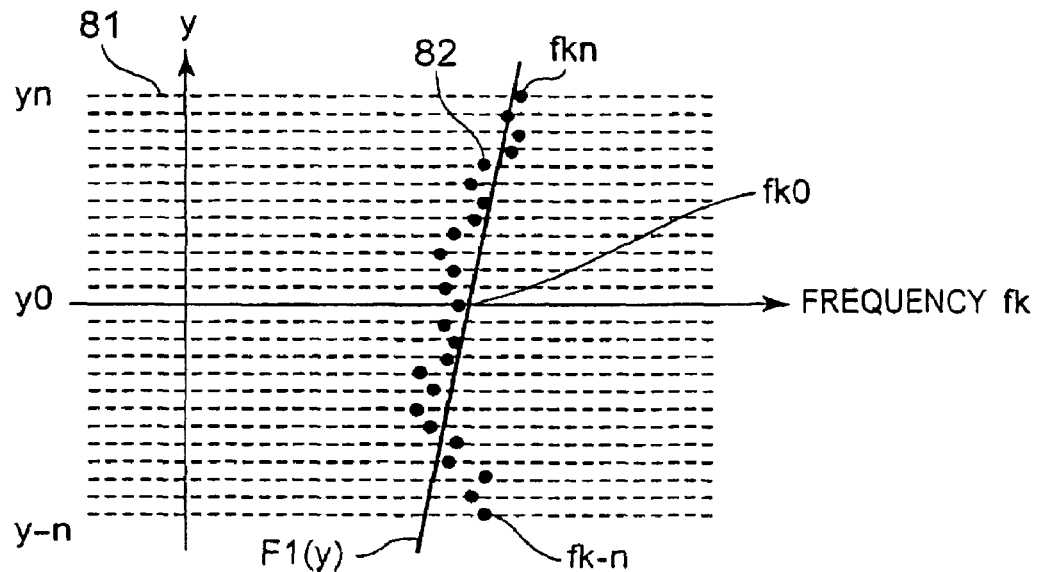
FIG. 13 is a graph illustrating the frequency characteristics which show the distribution of the maximal frequencies obtained on each of the plurality of third linear lines, and the linear function as the result of recursion of the frequency characteristics to a linear line.
Figure 14:
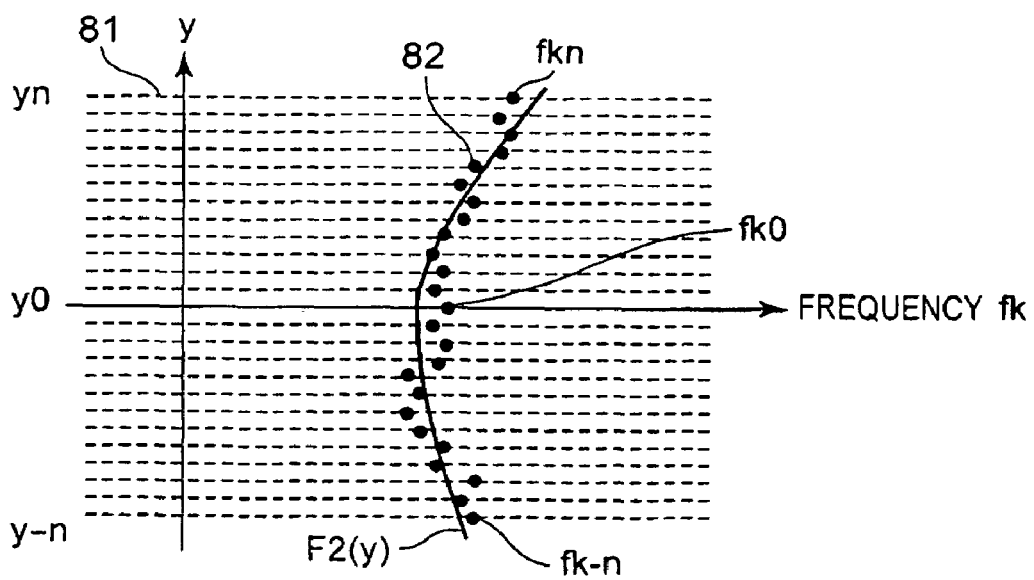
FIG. 14 is a graph illustrating the frequency characteristics which show the distribution of the maximal frequencies obtained on each of the plurality of third linear lines, and the quadratic function as the result of recursion of the frequency characteristics to a curved line.
Figure 15:
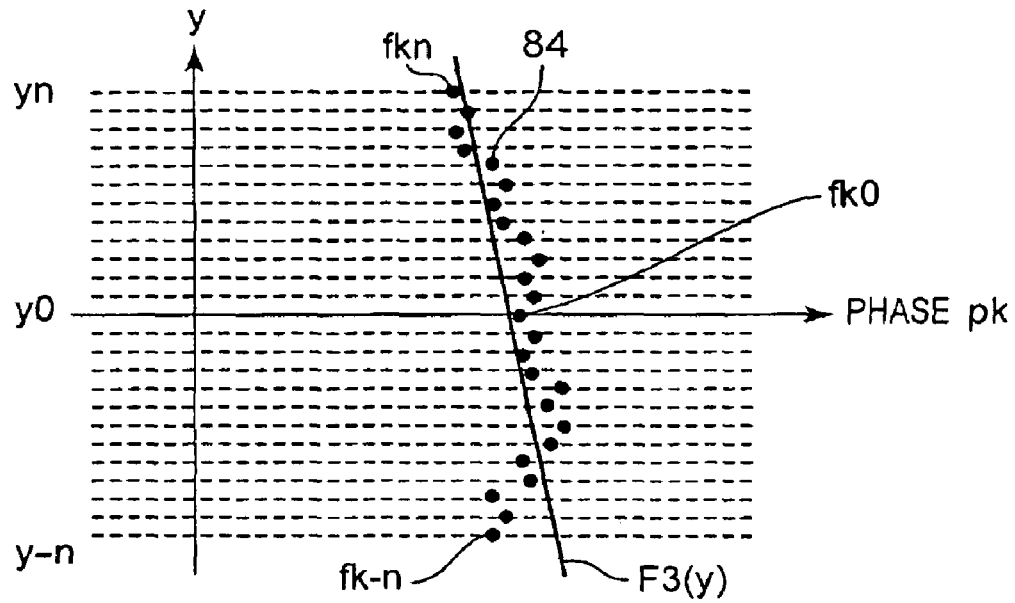
FIG. 15 is a graph illustrating the frequency characteristics which show the distribution of the maximal frequencies obtained on each of the plurality of third linear lines, and the linear function as the result of recursion of the frequency characteristics to a linear line, as well as FIG. 13.
Figure 16:
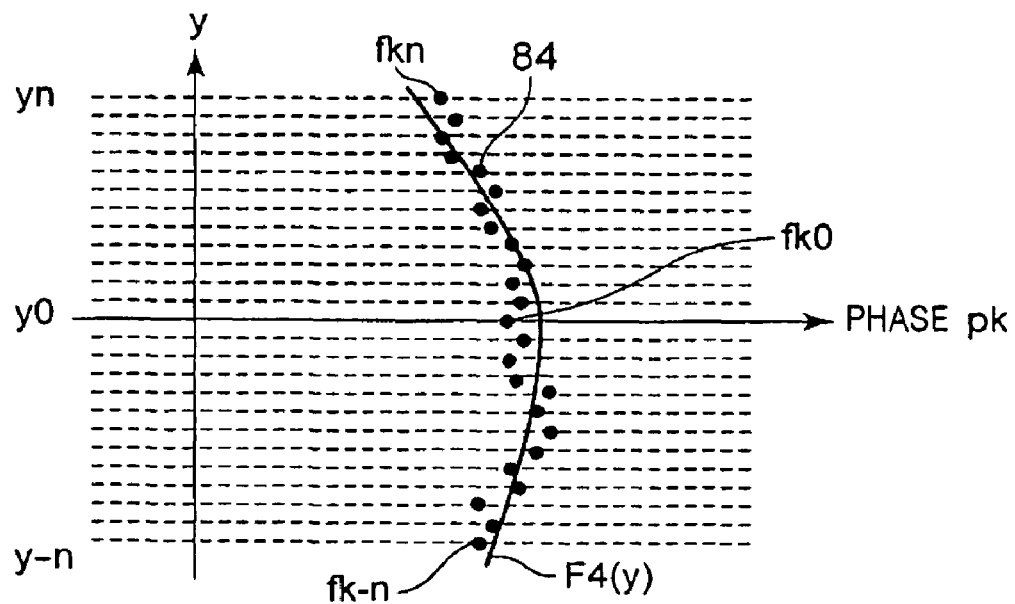
FIG. 16 is a graph illustrating the frequency characteristics which show the distribution of the maximal frequencies obtained on each of the plurality of third linear lines, and the quadratic function as the result of recursion of the frequency characteristics to a curved line, as well as FIG. 14.

At step S7, the analyzer 44 performs the Fourier analysis using the values of the light intensities obtained at the measuring points 74 on each of the linear lines 72 to obtain a relationship 78 between the frequency and the light intensity shown in FIG. 11 and a relationship 80 between the frequency and the phase shown in FIG. 12. Next, at step S8, a frequency fk corresponding to the maximal light intensity Imax is determined from the relationship 78 between the frequency and the light intensity shown in FIG. 11. At step S9, a phase Pk corresponding to the frequency fk is determined from the relationship 80 between the frequency and the phase shown in FIG. 12. This processing is performed on each of the linear lines 72, and the frequency fk and the phase Pk are obtained for each of the linear lines 72. Next, as shown in FIGS. 13 and 14, the frequencies fk are plotted on a frequency coordinate system 81 in which the axis of abscissa represents the frequency and the axis of ordinate represents Y-axis, to obtain the frequency characteristics 82. Further, as shown in FIGS. 15 and 16, the phases Pk are plotted on a phase coordinate system 83 in which the axis of abscissa represents the phase and the axis of ordinate represents Y-axis, to obtain the phase characteristics 84. For better understanding of the invention, in this embodiment, the frequencies and the phases are practically plotted on the graphs as shown in FIGS. 13 and 14. However, this plotting of the frequencies and the phases on the graphs is not always needed, and instead, the relationship among the frequency, the phase and the Y axis coordinate (shown in FIGS. 13 and 14) may be recorded on the memory of a computer.

Figure 17A:
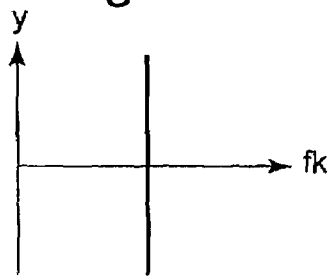
FIG. 17 is a graph illustrating the frequency characteristics and the phase characteristics derived from the coma-aberration (X).
Figure 17B:
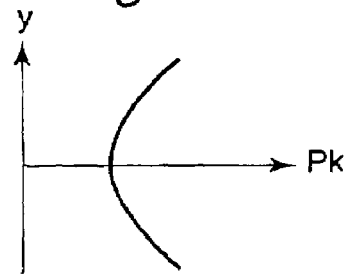
Figure 18A:
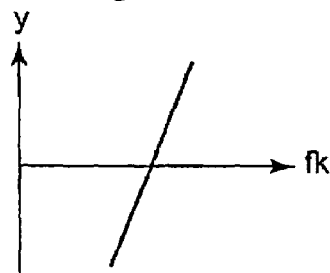
FIG. 18 is a graph illustrating the frequency characteristics and the phase characteristics derived from the coma-aberration (Y).
Figure 18B:
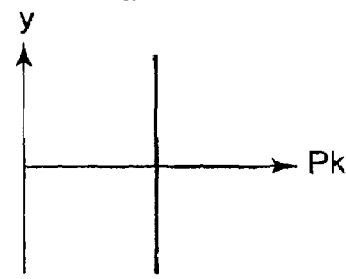
Figure 19A:
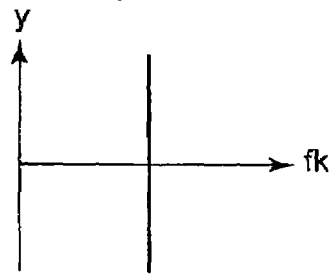
FIG. 19 is a graph illustrating the frequency characteristics and the phase characteristics derived from the astigmatism.
Figure 19B:
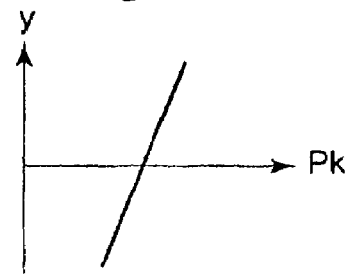
Figure 20A:
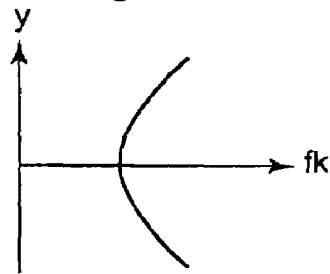
FIG. 20 is a graph illustrating the frequency characteristics and the phase characteristics derived from the spherical aberration
Figure 20B:
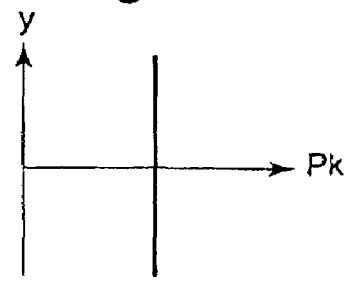

The frequency characteristics 82 and the phase characteristics 84 are related to a variety of aberrations contained in the lens 18. Typically, when the lens 18 contains a come-aberration (X), a coma-aberration (Y), an astigmatism and a spherical aberration, the frequency characteristics shown in FIGS. 17A, 18A, 19A and 20A and the phase characteristics shown in FIGS. 17B, 18B, 19B and 20B are drawn. Specifically, when the lens 18 contains a coma-aberration (X), the frequency characteristics are represented by a given linear line which is drawn for the frequency fk [see FIG. 17A], and the phase characteristics are represented by a curve of a quadratic function which is drawn for the phase Pk [see FIG. 17B]. When the lens 18 contains a coma-aberration (Y), the frequency characteristics are represented by a linear line of a linear function, which is drawn for the frequency fk [see FIG. 18A], and the phase characteristics are represented by a given linear line which is drawn for the phase Pk [see FIG. 18B]. When the lens 18 contains an astigmatism, the frequency characteristics are represented by a given linear line which is drawn for the frequency fk [see FIG. 19A], and the phase characteristics are represented by a linear line of a linear function which is drawn for the phase Pk [see FIG. 19B]. When the lens 18 contains a spherical aberration, the frequency characteristics are represented by a curved line of a quadratic function which is drawn for the function fk [see FIG. 20A], and the phase characteristics are represented by a given linear line which is drawn for the phase Pk [see FIG. 20B].

Accordingly, as shown in FIG. 13, at step S10, the analyzer 44 performs a fitting operation in which a linear function $F_1(y)$ represented by the following Equation 1 is fitted to the frequency characteristics 82 plotted on the frequency coordinate system 81 to determine the linear coefficient of the function $F_1(y)$ (i.e., the coefficient "$a_1$" of "y") as the evaluation value of the coma-aberration (Y).

$$F_1(y) = a_1 \cdot y + c_1 \qquad \text{[Equation 1]}$$

Similarly, as shown in FIG. 14, at step S10, a quadratic function $F_2(y)$ represented by the following Equation 2 is fitted to the frequency characteristics 82 to determine the quadratic coefficient of the function $F_2(y)$ (i.e., the coefficient "$a_2$" of "$y^2$") as the evaluation value of the spherical aberration.

$$F_2(y) = a_2 \cdot y^2 + b_2 \cdot y + c_2 \qquad \text{[Equation 2]}$$

Further, as shown in FIG. 15, at step S10, a liner function $F_3(y)$ represented by the following Equation 3 is fitted to the phase characteristics 84 plotted on the phase coordinate system 83 to determine the linear coefficient (i.e., the coefficient "$a_3$" of "y") of the function $F_3(y)$ as the evaluation value of the astigmatism.

$$F_3(y) = a_3 \cdot y + c_3 \qquad \text{[Equation 3]}$$

Then, as shown in FIG. 16, at step S10, a quadratic function $F_4(y)$ represented by the following Equation 4 is fitted to the phase characteristics to determine the quadratic coefficient (i.e., the coefficient "$a_4$" of "$y^2$") of the function $F_4(y)$ as the evaluation value of the come-aberration (X).

$$F_4(y) = a_4 \cdot y^2 + b_4 \cdot y + c_4 \qquad \text{[Equation 4]}$$

The fitting to the linear line and the curved line is performed by the known recursions for linear line and curved line.

Finally, at step S11, the analyzer 44 indicates the evaluation values ($a_1$ to $a_4$) of the coma-aberration (X), the coma-aberration (Y), the astigmatism and the spherical aberration thus obtained on the display 48.

<3. Second Embodiment of Inspection Apparatus>

Figure 21:
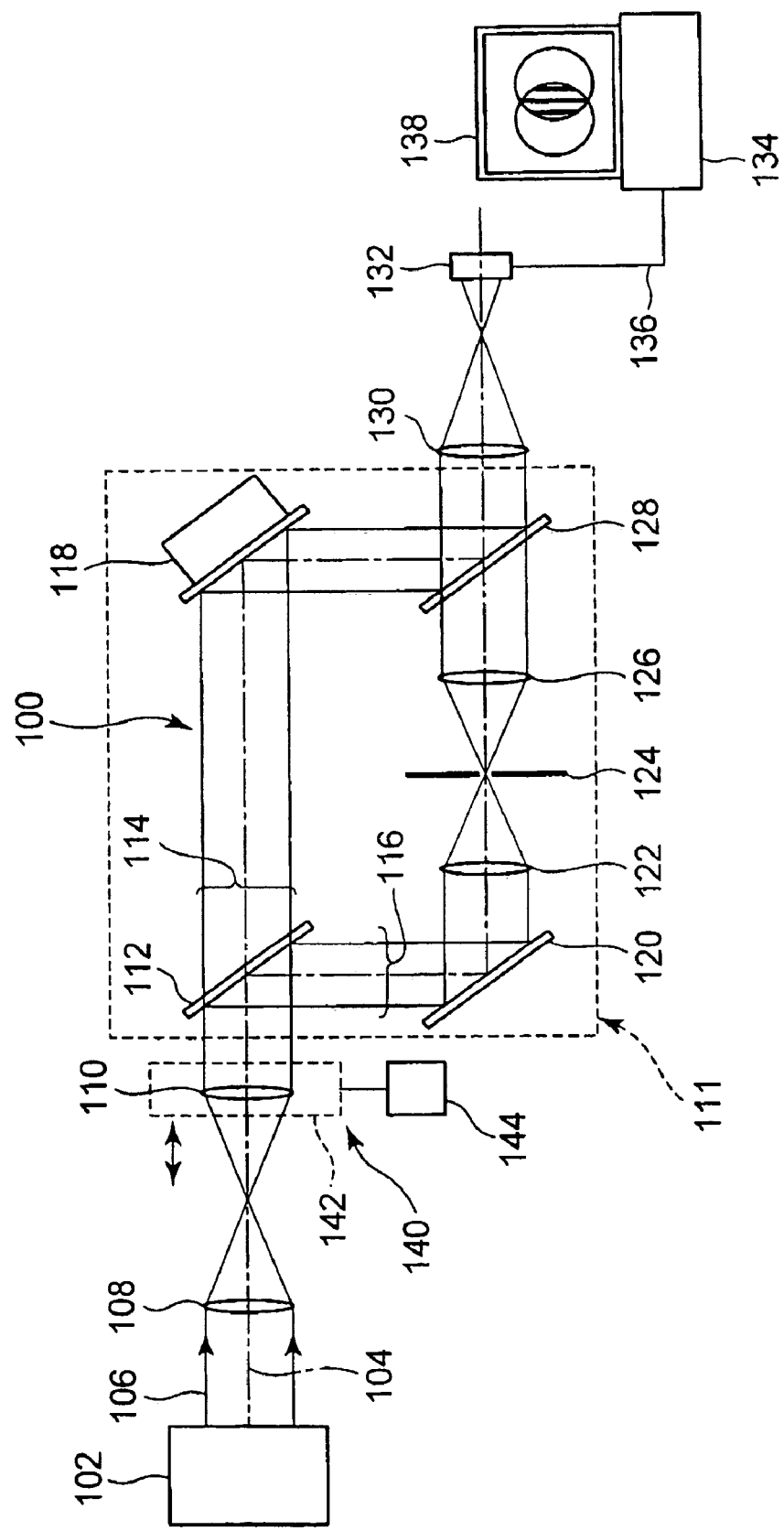
FIG. 21 is a diagram illustrating the arrangement of an inspection apparatus according to the second embodiment of the present invention.

FIG. 21 shows the arrangement of an inspection apparatus 100 according to the second embodiment of the present invention. As shown in FIG. 21, the light source 102 emits light (original light) 106 along the optical axis 104 of the inspection apparatus 100. The light 106 enters an optical component 110, i.e., subject for inspection, through the lens 108. The optical component is disposed on the optical axis 104. In this embodiment, the optical component is a convex lens 108 which is disposed with its center axis substantially aligned with the optical axis 104. As well as the first embodiment, the subject to be inspected is not limited to the convex lens but may be any lenses such as a concave lens, an aspherical lens and a cylindrical lens. Further, the inspected member may include other optical components such as an objective lens, a mirror, an aperture plate and a prism.

The interference fringe-forming means 111, which is located on the traveling paths of the light 106 passed through the lens 110, is provided with means for generating two light beams having different phases from the original light 106. In this embodiment, the interference fringe-forming means 111 includes a half mirror 112 for dividing the light 106 into a first light beam 114 and a second light beam 116, disposed on the traveling path of the light 106 passed through the lens 110.

A phase modulation unit (i.e., phase-modulating means) 118 is disposed on the traveling path of the first light beam 114. The phase modulation unit 118, which is used to change the phase of the entering light, may be, for example, Photo-address Type Parallel Oriented Liquid Crystal Spatial Photo-Modulator of PAL-SLM series, and Programmable Phase Modulators of X8077 series and X8267 series commercially available from HAMAMATSU PHOTONICS K.K., 325-6, Sunayama-cho, Hamamatsu-shi, Shizuoka-ken, Japan. This allows that the light beam 114 is transmitted to the phase modulation unit 118 where it is modulated in phase. The phase-modulated light beam is then transmitted into the half mirror 128 disposed on the traveling path of the second light beam 116.

Disposed on the traveling path of the second light beam 116 are a mirror 120, a light-converging lens 122, an aperture plate 124, a lens 126 and the half mirror 128. The second light beam 116 having the same phase as the original light 106 and the first light beam 114 modulated in phase as above are superposed on each other on the half mirror 128. The two light beams 114 and 116 superposed on each other on the half mirror 128 are converged by the lens 130, and this converged light is transmitted into the image pickup device 130. Preferably, the image pickup device 130 is made of a charge coupled device (CCD).

The analyzer 134 is connected to the image pickup device 132 through the communication line or cable 136, so that the image data picked up by the image pickup device 132 are transmitted to the analyzer 134 through the cable 136. Preferably, the analyzer 134 is connected to the display 138, so as to display the image picked up by the image pickup device 132 (i.e., an interference figure of the light beam 114 which is modulated in phase and the light beam 116 which is not modulated in phase) and the result of an analysis by the analyzer 134 as described later.

As has been described in the part of the first embodiment, the inspection apparatus 100 includes a drive mechanism 140 which moves the lens 110 in a direction parallel to the optical axis 104, in order to adjust the number of interference fringes included in the interference figure received by the image pickup device 132. The drive mechanism 140 includes a holder 142 which holds the lens 110, and a driving source 144 which moves this holder 142 together with the lens 110 in the optical axial direction.

In the inspection apparatus 100 so constructed, the light 106 emitted from the light source 102 enters the lens 110 to be inspected through the lens 108 and then enters the interference fringe-forming means 111, in which the light 106 is divided by the half mirror 112, into the first light beam 114 and the second light beam 116. Next, the first light beam 114 enters the phase modulation unit 118 where it is modulated in phase and then enters the half mirror 128. On the other hand, the second light beam 116 reflects on the mirror 120, and the reflected light beam 116 is converged by the lens 122 and is passed through the aperture plate 124, entering the half mirror 128 through the lens 126. The two incident lights, the first light beams 114 with the modulated first phase and the second light beam 116 with the non-modulated second phase are superposed with each other the half mirror 128 to form an interference figure. The interference figure is received by the image pickup device 132 through the lens 130. The image pickup device 132 transmits the data of the received figure, i.e., the interference figure to the analyzer 134 through the cable 136. The analyzer 134 processes the image according to the above described analyzing method, to thereby evaluate the aberration or the optical characteristics of the lens 108. To evaluate the optical characteristics, the evaluation values ($a_1$ to $a_4$) of the coma-aberration (X), the coma-aberration (Y), the astigmatism and the spherical aberration as the results of the evaluation are displayed on the display 138, as has been described in the part of the first embodiment. If needed, the drive mechanism 140 may be driven to adjust the position of the lens 110 so as to adjust the number of interference fringes.

<4. Inspection Apparatus According to Third Embodiment>

Figure 22:
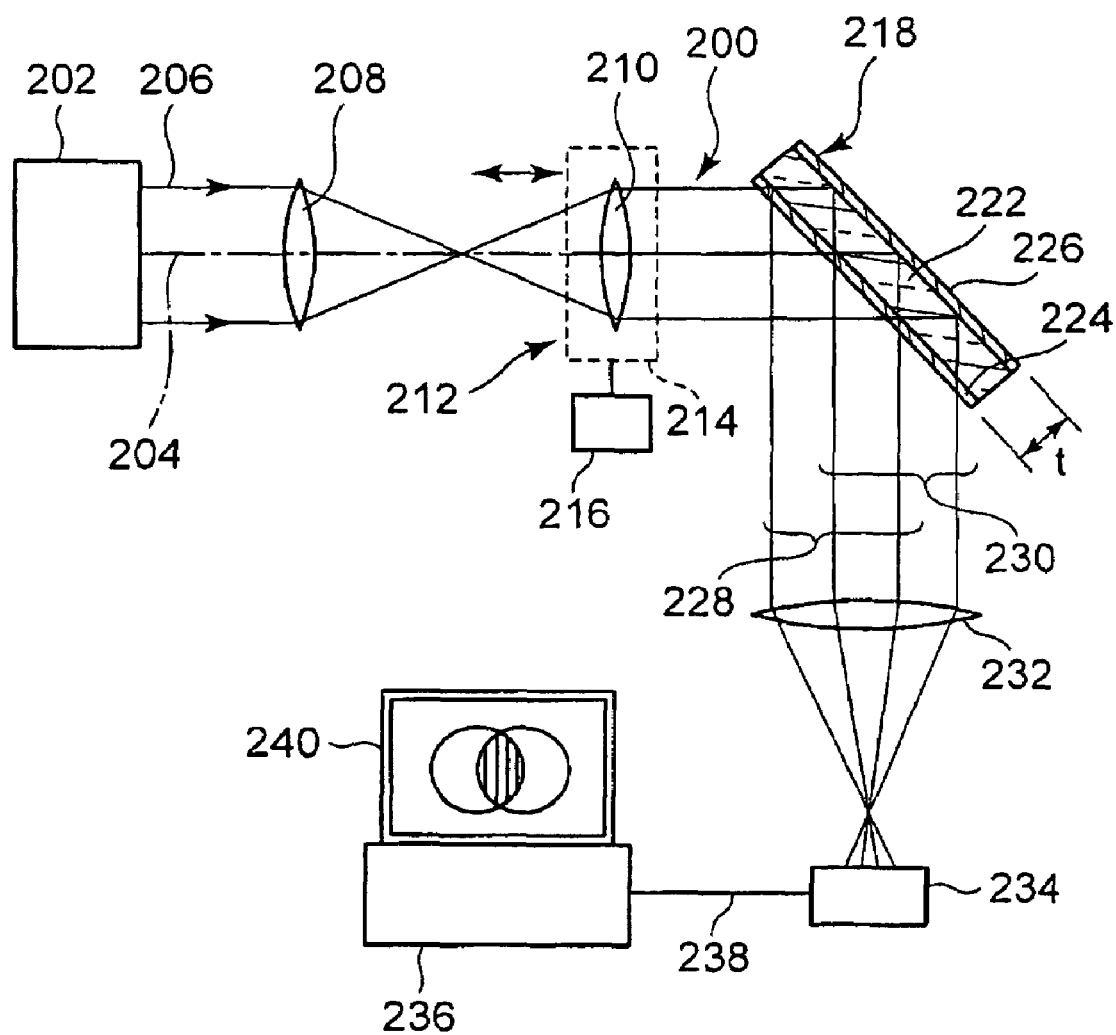
FIG. 22 is a diagram illustrating the arrangement of an inspection apparatus according to the third embodiment of the present invention.
Figure 23:
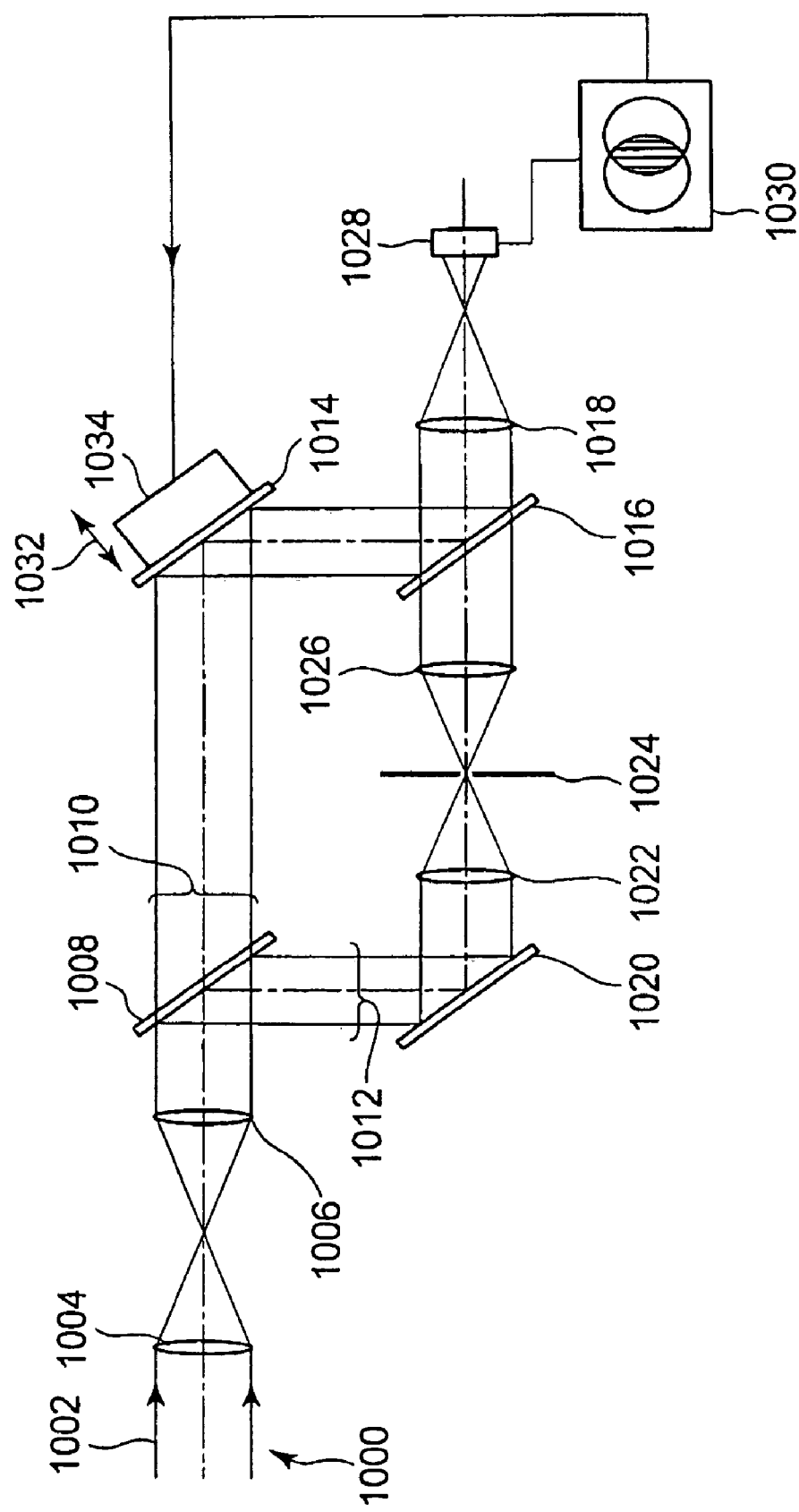
FIG. 23 is a diagram illustrating the arrangement of Mach-Zehnder radial shearing interferometer.
Figures 24A, 24B, 24C, 24D:
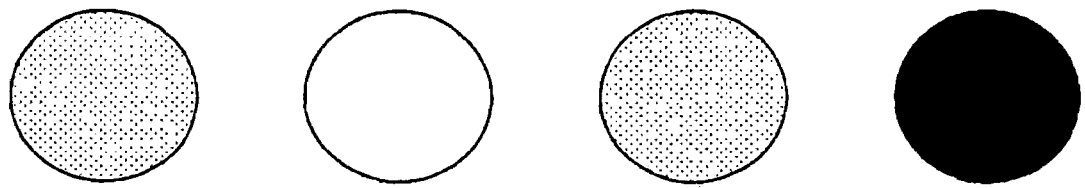
FIGS. 24A-24D are diagrams illustrating the brightness of an interference figure which the image pickup device receives, when the mirror of the interferometer shown in FIG. 23 is moved in the optical axial direction by every one fourth of the wavelength of the light.
Figure 25:
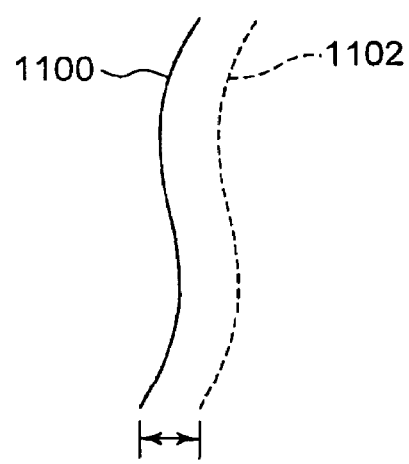
FIG. 25 is a diagram illustrating two wave fronts for use in the phase shift method.
Figure 26A:
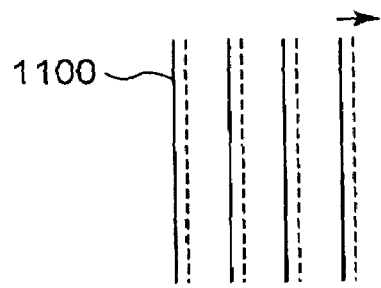
FIGS. 26A-26B are diagrams illustrating the advance of one wave front which has an advancing phase, in the phase shift method [FIG. 26A], and two points on the advancing wave front [FIG. 26B].
Figure 26B:
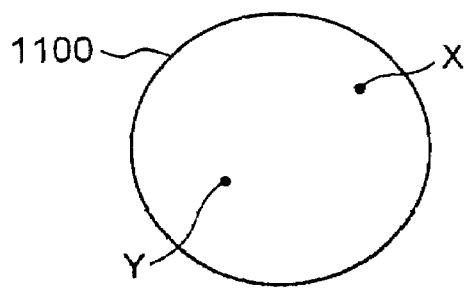
Figure 27A:
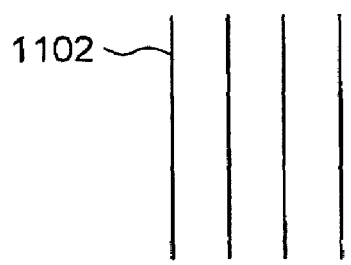
FIGS. 27A-27B are diagrams illustrating the advance of the other wave front which has a fixed phase, in the phase shift method [FIG. 27A], and two points on the other wave front whose phase is fixed [FIG. 27B].
Figure 27B:
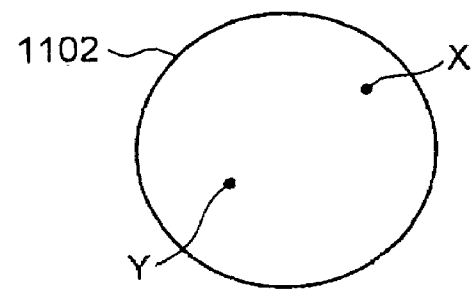
Figure 28:
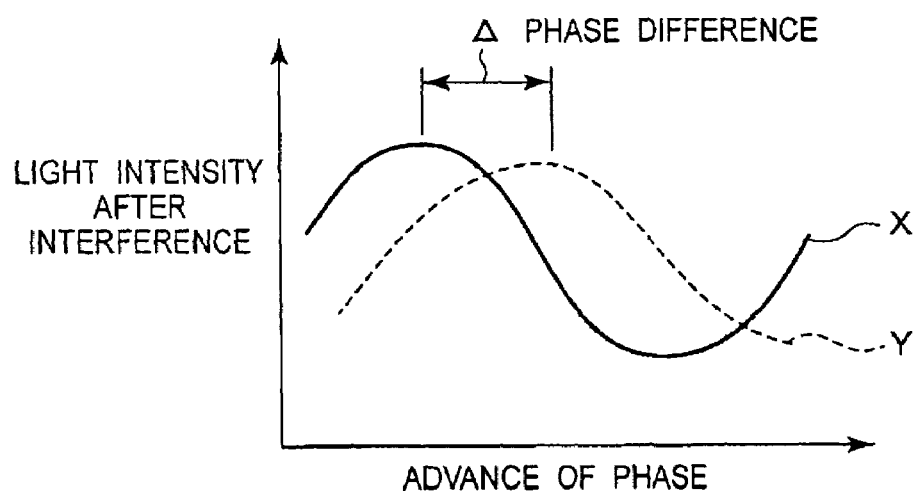
FIG. 28 is a graph illustrating the advance of the wave front and the changes of the light intensities of the two points in the interference figure.

FIG. 22 shows an inspection apparatus 200 according to the third embodiment. As shown in FIG. 22, the light source 202 emits light (original light) 206 along the optical axis of the inspection apparatus 200, to an optical component as a subject. The optical component to be inspected is disposed on the optical axis 204. In this embodiment, the optical component is a convex lens 208, which is disposed with its center axis substantially aligned with the optical axis 204. Similar to the first and second embodiments, the subject to be inspected is not limited to the convex lens, and the subject may be any of a concave lens, an aspherical lens or a cylindrical lens. Also, the subject is not limited to lenses, and it may be other optical component such as an objective lens, a mirror, an aperture plate or a prism.

The lens 210 is disposed on the traveling path of the light which has passed through the lens 208. As has been described in the part of the first embodiment, the inspection apparatus 200 includes a drive mechanism 212 which moves the lens 210 in a direction parallel to the optical axis 204, so as to adjust the number of interference fringes contained in an interference figure which the image pickup device receives. The drive mechanism 212 includes a holder 214 which holds the lens 210, and a driving source 216 which moves the holder 214 together with the lens 210 in the optical axial direction.

The interference fringe-forming means 218 is disposed on the traveling path of the light which has passed through the lens 210. The interference fringe-forming means 218 includes a mirror 220 having a predetermined thickness "t". Preferably, the thickness "t" of the mirror 220 satisfies the relationship of the following equation 5, so as to obtain an interference figure from the light which enters the mirror 220.

$$0 < \sqrt{2} \cdot t < \phi \qquad \text{[Equation 5]}$$

t: thickness of the mirror

φ: diameter of light flux entering mirror

The mirror 220 includes a substrate 222 of a light-transmitting material, a first reflecting layer 224 formed on the front face of the substrate 222, and a second reflecting layer 226 formed on the rear face of the substrate 222. Preferably, the substrate 222 is formed of a material capable of transmitting the incident light without loss (e.g., glass). For example, the first reflecting layer 224 is so designed as to reflect a part of the light entering the mirror 220 to generate a first light beam (component light) 228, and the second reflecting layer 226 is so designed as to reflect a part of the light entering the mirror 220 to generate a second light beam (component light) 230. The reflecting layers 224 and 226 are formed by vapor-depositing a highly reflective material such as aluminum on the front surface and the rear surface of the substrate 222, respectively. The reflectance of the reflecting layer is adjusted by controlling the thickness thereof. Preferably, the thickness of the reflecting layers 224 and 226 is so determined that the intensity of the first light beam generated from the mirror 220 can be substantially equal to that of the second light beam generated from the mirror 220.

As shown in FIG. 22, the first light beam 228 and the second light beam 230 both reflected from the mirror 220 have a phase differences therebetween, corresponding to the difference in optical path length therebetween (: $\sqrt{2}$.t), for example, when the mirror 220 is inclined at an angle of 45° relative to the optical axis 204. Therefore, the light beams 228 and 230 from the mirror 220 are superposed on each other to form an interference figure.

The light beams 228 and 230 containing the interference figure are converged by the lens 232, and the converged light beams are transmitted to the image pickup device 234. In this regard, preferably, the image pickup device 234 is made of a charge coupled device (CCD).

The analyzer 236 is connected to the image pickup device 234 through the communication line or cable 238, so that the data of an image picked up by the image pickup device 234 are transmitted to the analyzer 236 through the cable 238. Preferably, the analyzer 236 is connected to the display 240, which displays the image picked up by the image pickup device 234. The image includes the interference figure formed of the light beams 228 and 230 having respective phases. The result of an analysis by the analyzer 236 is illustrated as will be described later.

In the inspection apparatus 200 so constructed, the light 206 from the light source 202 enters the lens 210 through the lens 208 to be inspected, and then enters the mirror 218 or the interference fringe-forming means. The mirror 218 reflects a part of the entering light at the first reflecting layer 224 on its front face, to generate the first light beams 228. The light which has passed through the first reflecting layer 224 further passes through the substrate 230, and then enters the second reflecting layer 226 on the rear face of the mirror. The light substantially fully reflects on the second reflecting layer 226 to generate the second light beam 230. The second light beam 230 reflected from the second reflecting layer 226 passes through the substrate 222 and the first reflecting layer 224, and is superposed on the first light beam 228 to form the interference FIG. 242. Then, the interference figure is received by the image pickup device 234 through the lens 232. The image pickup device 234 transmits the data of the received image or the interference figure to the analyzer 236 through the cable 238. The analyzer 236 processes the image according to the above described analyzing method, to thereby evaluate the aberration of the lens 208 as the optical characteristics thereof. The method for evaluating the optical characteristics has been described in the part of the first embodiment. The evaluation values ($a_1$ to $a_4$) of the coma-aberration (X), the coma-aberration (Y), the astigmatism and the spherical aberration as the results of the evaluation are indicated on the display 240. In this evaluation, the drive mechanism 212 is driven to adjust the position of the lens 208 so as to adjust the number of interference fringes.

As has been fully described as above, the methods and the apparatuses for inspection of optical components, according to the present invention, do not need any mechanism for moving the diffraction grating in a direction perpendicular to the optical axis, and do not suffer from disturbances due to external vibrations or unevenness of the atmosphere. Therefore, the methods and the apparatuses for inspection of optical components, according to the present invention, is ensured to evaluate the performance of optical components in a precise manner.

The invention claimed is:

1. A method for inspecting an optical component, comprising the steps of
    generating a first light beam and a second light beam both having difference phases, from original light which has passed through the optical component;
    interfering the first light beam with the second light beam to form an interference region;
    setting a first linear line which connects the first center of the first light beam to the second center of the second light beam, and a second linear line which passes through the mid point between the first center and the second center, and intersects vertically to the first linear line;
    setting a plurality of third points on the second linear line within the interference region;
    setting a plurality of third linear lines which pass through the plurality of the third points and extend in parallel to the first linear line, respectively;
    setting a plurality of evaluation points on each of the plurality of the third linear lines;
    determining a distribution of light intensities at the plurality of the evaluation points for each of the plurality of the third linear lines;
    determining a distribution of light intensities at the plurality of the evaluation points for each of the plurality of the third linear lines;
    determining a frequency versus light intensity relationship from the distribution of the light intensities which is determined for each of the plurality of the third linear lines;
    determining a frequency versus light intensity relationship from the distribution of the light intensities which is determined for each of the plurality of the third linear lines;
    approximating a function to the plurality of the frequencies determined for each of the plurality of the third linear lines, and
    evaluating the aberration of the optical component based on the coefficient of the approximated function.

2. The method of claim 1, wherein the function is a linear function, and wherein the coma-aberration of the optical component with respect to the direction of the first linear line is evaluated based on the linear coefficient of the linear function.

3. The method of claim 1, wherein the function is a quadratic function, and wherein the spherical aberration of the optical component is evaluated based on the quadratic coefficient of the quadratic function.

4. A method for inspecting an optical component, comprising the steps of
    generating a first light beam and a second light beam both having difference phases, from original light which has passed through the optical component;
    interfering the first light beam with the second light beams to form an interference region;
    setting a first linear line which connects the first center of the first light beam to the second center of the second light beam, and a second linear line which passes through the mid point between the first center and the second center, and intersects vertically to the first linear line;

setting a plurality of third points on the second linear line within the interference region;

setting a plurality of third linear lines which pass through the plurality of the third points and extend in parallel to the first linear line, respectively;

setting a plurality of evaluation points on each of the plurality of the third linear lines;

determining a distribution of light intensities at the plurality of the evaluation points for each of the plurality of the third linear lines;

determining a frequency versus light intensity relationship and a frequency versus phase relationship from the distribution of the light intensities which is determined for each of the plurality of the third linear lines;

determining a frequency corresponding to a maximal light intensity for each of the plurality of the third linear lines, from the frequency versus light intensity relationship;

determining a phase corresponding to the maximal light intensity for each of the plurality of the third linear lines, from the frequency versus phase relationship;

approximating a function to the plurality of the phases determined on each of the plurality of the third linear lines; and evaluating an aberration of the optical component based on a coefficient of the approximated function.

5. The method of claim 4, wherein the function is a quadratic function, and wherein the coma-aberration of the optical component with respect to the direction of the second linear line is evaluated based on the quadratic coefficient of the quadratic function.

6. The method of claim 4, wherein the function is a linear function, and wherein the astigmatism of the optical component is evaluated based on the linear coefficient of the linear function.

7. An apparatus for inspection of an optical component, comprising
a first means which generates a first light beam and a second light beam both having difference phases, from an original light which has passed through an optical component;
a second means which interferes the first light beam with the second light beam to form an interference figure;
a third means which receives the interference figure; and
a fourth means which evaluates the optical characteristics of the optical component from the interference figure received by the third means;
wherein the fourth means includes
a means for setting a first linear line which connects the first center of the first light beam to the second center of the second light beam, and a second linear line which passes through the mid point between the first center and the second center, and intersects vertically to the first linear line, setting a plurality of third points on the second linear line within the interference region, setting a plurality of third linear lines which pass through the plurality of the third points and extend in parallel to the first linear line, respectively, and then setting a plurality of evaluation points on each of a plurality of third linear lines;
a means for determining a distribution of light intensities of the plurality of the evaluation points for each of the plurality of the third linear lines;
a means for determining a frequency versus light intensity relationship from the distribution of the light intensities determined for each of the plurality of the third linear lines;
a means for determining a frequency corresponding to the maximal light intensity, from the frequency versus light intensity relationship determined for each of the plurality of the third linear lines;
a means for approximating a function to the plurality of frequencies for each of the plurality of the third linear lines; and
a means for evaluating the aberration of the optical component based on the coefficient of the approximated function.

8. The apparatus of claim 7, wherein the means for evaluating the aberration of the optical component sets a linear function as the function, and evaluates the coma-aberration of the optical component with respect to the direction of the first linear line, based on the linear coefficient of the linear function.

9. The apparatus of claim 7, wherein the means for evaluating the aberration of the optical component sets a quadratic function as the function, and evaluates the spherical aberration of the optical component, based on the quadratic coefficient of the quadratic function.

10. An apparatus for inspection of an optical component, comprising
a first means which generates a first light beam and a second light beam both having difference phases, from an original light which has passed through an optical component;
a second means which interferes the first light beam with the second light beam to form an interference figure;
a third means which receives the interference figure, and
a fourth means which evaluates the optical characteristics of the optical component from the interference figure received by the third means;
wherein the fourth means includes
a means for setting a first linear line which connects the first center of the first light beam to the second center of the second light beam, and a second linear line which passes through the mid point between the first center and the second center, and intersects vertically to the first linear line, setting a plurality of third points on the second linear line within the interference region, setting a plurality of third linear lines which pass through the plurality of the third points and extend in parallel to the first linear line, respectively, and then setting a plurality of evaluation points on each of a plurality of third linear lines;
a means for determining a distribution of light intensities of the plurality of the evaluation points for each of the plurality of the third linear lines;
a means for determining a frequency versus light intensity relationship and a frequency versus phase relationship from the distribution of the light intensities which is determined for each of the plurality of the third linear lines;
a means for determining a frequency corresponding to a maximal light intensity for each of the plurality of the third linear lines, from the frequency versus light intensity relationship;
a means for determining a phase corresponding to the maximal light intensity for each of the plurality of the third linear lines, from the frequency versus phase relationship;
a means for approximating a function to the plurality of the phases determined for each of the plurality of the third linear lines; and a means for evaluating the aberration of the optical component based on the coefficient of the approximated function.

11. The apparatus of claim 10, wherein the means for evaluating the aberration of the optical component sets a quadratic function as the function, and evaluates the coma-aberration of the optical component with respect to the direction of the second linear line, based on the quadratic coefficient of the quadratic function.

12. The apparatus of claim 10, wherein the means for evaluating the aberration of the optical component sets a linear function as the function, and evaluates the astigmatism of the optical component, based on the linear coefficient of the linear function.

13. The apparatus of claim 7, wherein the first means includes a diffraction grating, and wherein the first light beam and the second light beam are diffracted rays obtained by diffracting the original light with the diffraction grating.

14. The apparatus of claim 7, wherein the first means includes a means for breaking the original light into two light beams, and a means for modulating the phase of one of the two light beams into which the breaking means breaks the original light.

15. The apparatus of claim 7, wherein the first means includes a first reflecting face which reflects the original light to lead the first light beam, and a second reflecting face which is disposed at a different position from the first reflecting face and which reflects the original light to lead the second light beam, and wherein the first reflecting face and the second reflecting face are disposed so that the first light beam and the second light beam are led to the second means.

* * * * *

UNITED STATES PATENT AND TRADEMARK OFFICE
CERTIFICATE OF CORRECTION

PATENT NO.       : 7,379,172 B2
APPLICATION NO.  : 11/319172
DATED            : May 27, 2008
INVENTOR(S)      : Kazumasa Takata et al.

It is certified that error appears in the above-identified patent and that said Letters Patent is hereby corrected as shown below:

In column 9,   line 50, change "16, for converting the incident light 16" to --16 is converted--.

line 51, change "beam" to --beams--.

line 59, change "beam" to --beams--.

In column 10,  line 63, change "62 and 64" to --60 and 62--.

In column 16, (claim 1), lines 7-8, change "comprising the steps of" to --comprising:--.

line 14, change "the first" to --a first--.

line 15, change "the second" to --a second--.

line 18, change "vertically to" to --orthogonally--.

In column 16, (claim 4), lines 55-56, change "comprising the steps of" to --comprising:--.

line 60, change "beams" to --beam--.

line 62, change "the first" to --a first--.

line 63, change "the second" to --a second--.

line 66, change "vertically to" to --orthogonally--.

In column 17, (claim 7), line 37, change "comprising" to --the apparatus comprising:--.

line 38, change "which generates" to --for generating--.

line 42, change "which interferes" to --for interfering--.

UNITED STATES PATENT AND TRADEMARK OFFICE
CERTIFICATE OF CORRECTION

PATENT NO. : 7,379,172 B2
APPLICATION NO. : 11/319172
DATED : May 27, 2008
INVENTOR(S) : Kazumasa Takata et al.

It is certified that error appears in the above-identified patent and that said Letters Patent is hereby corrected as shown below:

line 43, change "figure" to --region--.

line 44, change "figure" to --region--.

line 46, change "figure" to --region--.

lines 49-50, change "the first" to --a first--.

line 50, change "the second" to --a second--.

lines 53-54, change "vertically to" to --orthogonally--.

In column 18, (claim 10), line 23, change "comprising" to --the apparatus comprising:--.

line 24, change "which generates" to --for generating--.

line 28, change "which interferes" to --for interfering--.

line 29, change "figure" to --region--.

line 30, change "which receives" to --for receiving--.

line 30, change "figure" to --region--.

line 31, change "which evaluates" to --for evaluating--.

line 32, change "figure" to --region--.

lines 35-36, change "the first" to --a first--.

line 36, change "the second" to --a second--.

UNITED STATES PATENT AND TRADEMARK OFFICE
CERTIFICATE OF CORRECTION

PATENT NO. : 7,379,172 B2  Page 3 of 3
APPLICATION NO. : 11/319172
DATED : May 27, 2008
INVENTOR(S) : Kazumasa Takata et al.

It is certified that error appears in the above-identified patent and that said Letters Patent is hereby corrected as shown below:

lines 39-40, change "vertically to" to --orthogonally--.

Signed and Sealed this

Sixth Day of January, 2009

JON W. DUDAS
*Director of the United States Patent and Trademark Office*